(12) United States Patent
Shinohara et al.

(10) Patent No.: US 10,054,250 B2
(45) Date of Patent: Aug. 21, 2018

(54) FIXING DEVICE FOR LOWER STAGE MEMBERS AND FLUID CONTROL DEVICE EQUIPPED WITH FIXING DEVICE

(71) Applicant: FUJIKIN INCORPORATED, Osaka-shi (JP)

(72) Inventors: Tsutomu Shinohara, Osaka (JP); Takahiro Matsuda, Osaka (JP); Tomohiro Nakata, Osaka (JP); Michio Yamaji, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 15/213,703

(22) Filed: Jul. 19, 2016

(65) Prior Publication Data
US 2017/0045164 A1 Feb. 16, 2017

Related U.S. Application Data

(63) Continuation of application No. 14/007,737, filed as application No. PCT/JP2012/055683 on Mar. 6, 2012, now Pat. No. 9,423,060.

(30) Foreign Application Priority Data

Mar. 28, 2011 (JP) ................................. 2011-069620

(51) Int. Cl.
*F16B 5/02* (2006.01)
*F16B 43/00* (2006.01)
(Continued)

(52) U.S. Cl.
CPC ............ *F16L 19/00* (2013.01); *F16B 5/0241* (2013.01); *F16B 5/0258* (2013.01); *F16B 43/001* (2013.01); *F16K 27/003* (2013.01)

(58) Field of Classification Search
CPC ...... F16L 19/00; F16L 19/046; F16L 19/0218; F16B 5/0258; F16B 5/025; F16B 43/004; F16B 43/001
(Continued)

(56) References Cited

U.S. PATENT DOCUMENTS 2,081,040 A * 5/1937 King ..................... F16J 15/025
277/437
2,882,081 A * 4/1959 Tobias ..................... B63H 3/00
277/394
(Continued)

FOREIGN PATENT DOCUMENTS

JP 3774800 B2 4/1999
JP 2000-145979 A 5/2000
(Continued)

OTHER PUBLICATIONS

International Search Report dated Jun. 19, 2012, issued for PCT/JP2012/055683.

*Primary Examiner* — Seth W Mackay-Smith
(74) *Attorney, Agent, or Firm* — Locke Lord LLP

(57) ABSTRACT

Provided are a fixing device for a lower-stage member which facilitates a leveling operation for making upper surfaces of lower-stage members coplanar, and can further enhance a vibration absorbing effect generated by an elastic member, and a fluid control device which includes the fixing device. A fixing device for a lower-stage member is configured such that respective lower-stage members (2) are fixed once and, thereafter, a desired lower-stage member (2) is moved upwardly against an elastic force (21) so as to finely adjust positions of upper surfaces of a plurality of lower-stage members (2). The elastic member (21) is formed of an annular body made of rubber or a synthetic resin. A cutout (21a, 21b) which imparts the elastic deformation by bending when a force in the vertical direction is applied to the elastic (Continued)

member (21) is formed on an upper portion and a lower portion of an inner peripheral surface of the elastic member (21).

4 Claims, 5 Drawing Sheets

(51) Int. Cl.
  *F16L 19/00* (2006.01)
  *F16K 27/00* (2006.01)
(58) Field of Classification Search
  USPC .......... 277/644, 647; 411/371.1, 371.2, 369, 411/542
  See application file for complete search history.

(56) References Cited

U.S. PATENT DOCUMENTS

| | | | | |
|---|---|---|---|---|
| 2,941,105 A * | 6/1960 | Rickenbach | ............ | H01T 13/08 277/644 |
| 3,047,301 A * | 7/1962 | Taylor | ................. | F16J 15/0887 277/612 |
| 3,062,557 A * | 11/1962 | Underwood | .......... | F16B 43/001 277/630 |
| 3,275,335 A * | 9/1966 | Johnson | ............... | F16J 15/0887 277/639 |
| 3,322,433 A * | 5/1967 | Rentschler | ............. | B32B 27/00 277/644 |
| 3,591,207 A * | 7/1971 | Fisher | ................... | F16L 17/073 277/641 |
| 3,768,819 A * | 10/1973 | Burkert | .................. | F16J 15/025 277/647 |
| 3,915,462 A * | 10/1975 | Bruns | .................... | F16J 15/021 277/647 |
| 4,889,457 A * | 12/1989 | Hageman | .............. | F16B 31/028 411/10 |
| 5,597,166 A * | 1/1997 | Grytz | ................... | F02M 51/005 277/644 |
| 5,979,944 A * | 11/1999 | Yokoyama | .......... | F15B 13/0817 285/124.3 |
| 6,361,081 B1 * | 3/2002 | Yokoyama | ............ | F16K 27/003 285/124.3 |
| 6,507,976 B2 * | 1/2003 | Ichimaru | ................ | E05F 5/022 16/2.1 |
| 6,557,858 B1 * | 5/2003 | Carr | ....................... | F16J 15/027 277/628 |
| 7,004,474 B2 * | 2/2006 | Takahashi | ............ | F16J 15/3456 277/402 |
| 7,857,322 B2 * | 12/2010 | Fietz | ...................... | F16J 15/025 277/566 |
| 8,246,055 B2 * | 8/2012 | Asplund | .................. | F16L 23/22 277/609 |
| 2002/0031417 A1 * | 3/2002 | Hoshi | .................... | F16K 27/003 414/14 |

FOREIGN PATENT DOCUMENTS

JP  2001-289231 A  10/2001
JP  2002-206700 A  7/2002
WO  WO-2006/100841 A1  9/2006

* cited by examiner

FIXING DEVICE FOR LOWER STAGE MEMBERS AND FLUID CONTROL DEVICE EQUIPPED WITH FIXING DEVICE

TECHNICAL FIELD

The present invention relates to a fixing device which is used in a fluid control device assembled in such a manner that a plurality of joints (block joints) are fixed to a support member, and a fluid control unit is fixed in a straddling manner over these joints, and more particularly to a fixing device which fixes the block joint (lower-stage member) which is arranged between a support member and the fluid control unit (upper-stage member) to the support member, and a fluid control device equipped with the fixing device.

BACKGROUND ART

Patent literature 1 discloses a fixing device shown in FIG. 7 as a fixing device for a lower-stage member to which the present invention is also directed.

In FIG. 7, two block joints (51) are mounted on a support member (52), and a fluid control unit (not shown in the drawing) which constitutes an upper-stage is mounted in a straddling manner over both joints (51). In each block joint (51), a bolt insertion hole (54) through which a joint fixing bolt (53) passes at the time of mounting the block joint (51) on the support member (52) is formed. In the support member (52), a threaded hole (55) used at the time of mounting the block joint (51) on the support member (52) is formed.

The bolt insertion hole (54) formed in each block joint (51) is formed of a large-diameter portion (54a) having a diameter larger than a diameter of a bolt head portion (53a) and a small-diameter portion (54b) which is contiguously formed with the large-diameter portion (54a) byway of a stepped portion (54c) and has a diameter between the diameter of the bolt head portion (53a) and a diameter of a bolt shaft portion (53b).

A cylindrical spacer (56) which has a lower end thereof received by the support member (52) and an upper end thereof disposed in the large-diameter portion (54a) is fitted in the small-diameter portion (54b) of the bolt insertion hole (54). The spacer (56) has an inner diameter larger than a diameter of the bolt shaft portion (53b) and an outer diameter smaller than the diameter of the bolt head portion (53a). The shaft portion (53b) of the joint fixing bolt (53) is fitted into the spacer (56) and the head portion (53a) is received by an upper end surface of the spacer (56). The spacer (56) is provided for defining a fastening amount of the joint fixing bolt (53). The spacer (56) is formed such that when the joint fixing bolt (53) is made to pass through the bolt insertion hole (54) and is threaded into the threaded hole (55) formed in the support member (52), the spacer (56) is made to stretch between the bolt head portion (53a) of the joint fixing bolt (53) and the support member (52) thus stopping the further fastening of the joint fixing bolt (53).

An annular rubber washer (57) having an outer diameter approximately equal to the diameter of the head portion (53a) of the joint fixing bolt (53) is fitted on an upper end portion of the spacer (56). The rubber washer (57) is sandwiched between the head portion (53a) of the joint fixing bolt (53) and the stepped portion (54c) of the bolt insertion hole (54). A length of the rubber washer (57) in the vertical direction is set such that a compressive force is applied to the rubber washer (57) in a fastening completion state of the joint fixing bolt (53). Accordingly, both joints (51) are biased in the direction toward the support member (52) by the rubber washer (57).

In such a fixing device for a lower-stage member, the rubber washer (57) has elasticity and hence, the rubber washer (57) can be further deformed by compression. Accordingly, when upper surfaces of both joints (51) are not coplanar, one joint (51) having an upper surface lower than an upper surface of the other joint (51) can be moved upwardly.

That is, the fixing device for a lower-stage member is configured such that the respective lower-stage members (51) are fixed once and, thereafter, the desired lower-stage member (51) is moved upwardly against an elastic force of the rubber washer (57) so as to finely adjust positions of upper surfaces of a plurality of lower-stage members (51). Due to such constitution, the upper-stage members (51) can be easily mounted and, at the same time, it is possible to apply a proper amount of pressing force to all seal portions interposed between the lower-stage members (51) and the upper-stage members so that sealing property can be ensured. Patent literature 1 exemplifies the rubber washer (57) having a rectangular cross section as the elastic member.

CITATION LIST

Patent Literature

PTL 1: Japanese Patent 3774800

SUMMARY OF INVENTION

Technical Problem

According to the fixing device for a lower-stage member described in the above-mentioned patent literature 1, when the bolt for fixing the lower-stage member is fastened, the spacer is held between the bolt head portion and the support member. At this point of time, the elastic member biases each lower-stage member toward the support member so that each lower-stage member has no play. On the other hand, by elastically deforming the elastic member by compression, the lower-stage member having a lower upper surface is moved in the direction away from the support member and hence, upper surfaces of the lower-stage members can be made coplanar. Accordingly, the fixing device has an advantage that mounting of the upper-stage member on the lower-stage member can be performed easily. Further, the elastic member absorbs vibrations and hence, the fixing device is also advantageous with respect to a point that the bolt which is properly fastened once is prevented from being loosened due to vibrations or the like.

However, the elastic member having a rectangular cross section exhibits a limited compression elastic deformation amount and hence, the elastic member has a drawback that it is difficult to move upper surfaces of the lower-stage members to a coplanar plane at the time of performing the fine adjustment (leveling) of upper surface positions of the plurality of lower-stage members.

It is an object of the present invention to provide a fixing device for a lower-stage member which facilitates a leveling operation for making upper surfaces of lower-stage members coplanar, and can further enhance a vibration absorbing effect generated by an elastic member as well as a fluid control device which includes the fixing device.

Solution to Problem

A fixing device for a lower-stage member according to the present invention is a device for fixing a lower-stage member arranged between a support member and an upper-stage member and provided with a bolt insertion hole to the support member by a bolt, wherein the bolt insertion hole formed in the lower-stage member is formed of a large-diameter portion having a diameter larger than a diameter of a bolt head portion and a small-diameter portion which is contiguously formed with the large-diameter portion below the large-diameter portion by way of a stepped portion and has an intermediate diameter between the diameter of the bolt head portion and a diameter of a bolt shaft portion, a cylindrical spacer which has an inner diameter larger than the diameter of the bolt shaft portion and has a lower end thereof received by the support member and an upper end thereof disposed in the inside of the large-diameter portion is fitted into the small-diameter portion of the bolt insertion hole, and an elastic member which biases the lower-stage member toward the support member is interposed between the bolt head portion and the stepped portion, wherein a cutout which allows the elastic member to be elastically deformed by bending when a force in the vertical direction is applied to the elastic member is formed at at least one place among an outer peripheral surface, an inner peripheral surface, an upper surface and a lower surface of the elastic member.

Although a cross-sectional shape of the elastic member before the cutout is formed may be a rectangular shape, a circular shape (including an oblong shape and an elliptical shape), a polygonal shape or the like, the cross-sectional shape of the elastic member may preferably be an octagonal shape which is formed by cutting four corners of a rectangular shape (a rectangular shape elongated in the vertical direction). Due to such a cross-sectional shape, the elastic member is considered as a member which has an upper surface brought into contact with a lower surface of the bolt head portion or a lower surface of a flange of the spacer, a lower surface brought into contact with the stepped portion of the bolt insertion hole, an outer peripheral surface brought into contact with a circumferential surface of the large diameter portion of the bolt insertion hole, and an inner peripheral surface brought into contact with an outer peripheral surface of the spacer, and forms at least one cutout for forming a recessed portion on at least one surface among the upper surface, the lower surface, the outer peripheral surface and the inner peripheral surface.

The elastic member may preferably be formed of an annular body made of rubber or a synthetic resin.

The elastic member enables the upward movement of the lower-stage member due to the deformation thereof. In a fixing device which uses an elastic member capable of performing only deformation by compression, a movable amount of the lower-stage member in the upward direction is limited. By enabling the elastic member to perform the elastic deformation by bending, the movement of the lower-stage member in the upward direction can be performed with a small amount of force and hence, a leveling operation of making upper surfaces of the lower-stage members coplanar can be performed easily. Further, vibrations can be also absorbed due to the elastic deformation of the elastic member.

The spacer may have no flange (cylindrical body) or may have a flange on an upper end portion thereof. When the spacer has no flange, the elastic body is arranged between a lower surface of the head portion of the bolt and the stepped portion. When the spacer has a flange, the elastic body is arranged between a lower surface of the flange of the spacer and the stepped portion. The elastic member may preferably be arranged between a lower surface of the flange formed on the upper end portion of the spacer and the stepped portion.

A cross-sectional shape of the cutout may be an approximately rectangular shape, for example. However, the cross-sectional shape of the cutout is not limited to such a shape, and may be a triangular shape or an arcuate shape.

The cutout may be formed on two portions, that is, an upper portion and a lower portion of an inner peripheral surface or an outer peripheral surface of the elastic member respectively, for example (the cross-sectional shape being an approximately lateral T shape).

The cutout may be formed on two portions of the elastic member in total such that one cutout is formed on a vertical center portion of the inner peripheral surface and a vertical center portion of the outer peripheral surface of the elastic member respectively (cross-sectional shape being an approximately I shape or an approximately Z shape).

The cutout may be formed on one portion of a vertical center portion of an inner peripheral surface or an outer peripheral surface of the elastic member (cross-sectional shape being an approximately C shape or an approximately lateral U shape).

The cutout may be formed on three portions in total, that is, on an upper portion, on a lower portion and on a center portion of an inner peripheral surface or an outer peripheral surface of the elastic member respectively (cross-sectional shape being approximately lateral inverse-U shape).

The cutout may be formed on four portions in total, that is, vertical center portions of an inner peripheral surface and on an outer peripheral surface of the elastic member and on center portions of an upper surface and a lower surface of the elastic member respectively.

The cutout may not be limited to the above-mentioned cross-sectional shapes, and the cross-sectional shape of the cutout can be variously changed provided that the cutout imparts an action which enables the elastic member to be deformed elastically by bending when a force in the vertical direction is applied.

A fluid control device according to the present invention is a fluid control device which includes: a plurality of block joints in each of which a fluid path opening upward is formed; a plurality of fluid control units in each of which a fluid path communicated with the fluid path of the block joint and opening downward is formed; a plurality of seal portions which are interposed on abutting surfaces between the fluid paths of the block joints and the fluid paths of the fluid control units; a support member for supporting the plurality of block joints; a plurality of bolts for mounting the respective block joints to the support member; and a plurality of bolts for mounting the respective fluid control units to the block joints, wherein the block joint constitutes a lower-stage member, and the block joint is mounted on the support member by any one of the above-mentioned fixing devices for a lower-stage member.

In this specification, "vertical" means "vertical" in the drawings. However, this "vertical" is used for the sake of convenience. The fixing device and the fluid control device may also be installed on a horizontal plane in an up-side-down manner or on a vertical plane besides the installation on a horizontal plane in a state shown in the drawings.

Advantageous Effects of Invention

According to the fixing device for a lower-stage member of the present invention, the elastic member is formed of an annular body made of rubber or a synthetic resin, and a cutout which enables the elastic member to be elastically deformed by bending when a force is applied in the vertical direction is formed on at least one among an outer peripheral surface, an inner peripheral surface, an upper surface and a lower surface of the elastic member. Accordingly, compared to a fixing device which uses an elastic member which is deformable only by compression, the movement of the lower-stage member in the vertical direction can be performed with a small amount of force and hence, a leveling operation for making upper surfaces of the lower-stage members coplanar can be performed easily. Further, when vibrations are applied to the lower stage member, the elastic member is elastically deformed so as to absorb vibrations and hence, a vibration absorbing effect of a device (for example, a fluid control device) which uses the fixing device for a lower-stage member of the present invention can be enhanced.

Figure 1:
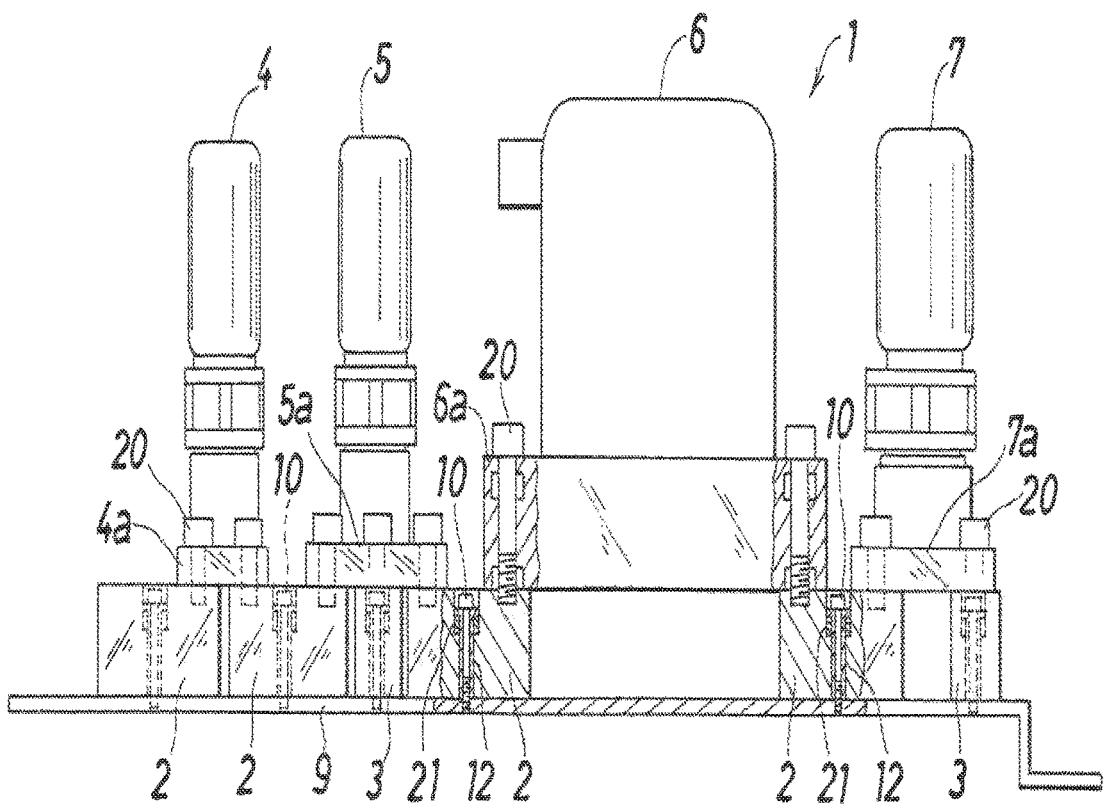
FIG. 1 is a side view with a part broken away showing a fluid control device of a first embodiment where a fixing device for a lower-stage member according to the present invention is used.

REFERENCE SIGNS LIST (2), (3): block joint (lower-stage member)
(4), (5), (6), (7): fluid control unit (upper-stage member)
(9): support member
(10): bolt
(10a): bolt head portion
(11): bolt insertion hole
(11a): large-diameter portion
(10b): bolt shaft portion
(11b): small-diameter portion
(11c): stepped portion
(12): spacer
(21), (22), (23), (24), (25), (26), (27): elastic member
(21a), (21b), (22a), (22b), (23a), (23b), (24a), (24b), (25a), (26a), (26b), (26c), (27a), (27b), (27c), (27d): cutout

DESCRIPTION OF EMBODIMENTS

An embodiment of the present invention is explained in conjunction with drawings hereinafter. In the explanation made hereinafter, upper and lower sides are upper and lower sides in FIG. 1.

FIG. 1 is a view schematically showing one example of a fluid control device where a fixing device for a lower-stage member according to the present invention is used. The fluid control device (1) is of a type which is used in a semiconductor manufacturing device or the like, and includes: a plurality of block joints (lower-stage members) (2), (3) in each of which an upwardly-opened fluid path is formed, a plurality of fluid control units (upper-stage members) (4), (5), (6), (7) in each of which a downwardly-opened fluid path communicated with the fluid path of the block joint (2), (3) is formed; a plurality of seal portions (not shown in the drawing) which are interposed in abutting surfaces between the fluid paths of the block joints (2), (3) and the fluid paths formed in bodies (4a), (5a), (6a), (7a) of the fluid control units (4), (5), (6), (7); a support member (9) which supports the plurality of block joints (2), (3); a plurality of bolts (10) by which the respective block joints (2), (3) are mounted on the support member (9); and a plurality of bolts (20) by which the respective fluid control units (4), (5), (6), (7) are mounted on the block joints (2), (3).

As described later, in fixing the block joints (2), (3), spacers (12) and elastic members (21) are used in addition to the bolts (10).

Figure 2:
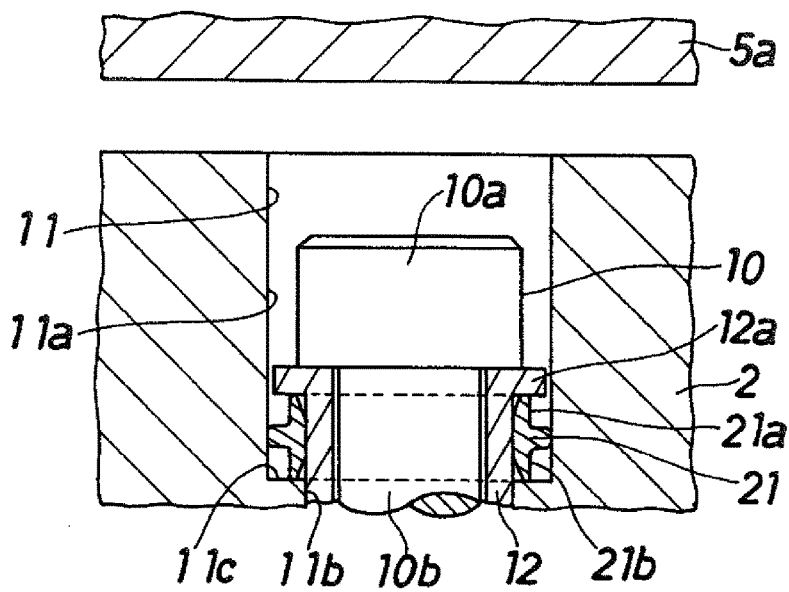
FIG. 2 is an enlarged cross-sectional view of an essential part of the fixing device for a lower-stage member according to the present invention.

FIG. 2 is a view showing the fixing device for a lower-stage member according to the present invention in an enlarged manner. The fixing device for a lower-stage member is a device for fixing the above-mentioned block joints (lower-stage members) (2) to the support member (9) by the bolt (10). As shown in FIG. 2, a bolt insertion hole (11) which is formed of a large diameter portion (11a) having a diameter larger than a diameter of a bolt head portion (10a) and a small diameter portion (11b) which is contiguously formed with the large diameter portion (11a) below the large diameter portion (11a) byway of a stepped portion (11c) and has an intermediate diameter between the diameter of the bolt head portion (10a) and a diameter of a bolt shaft portion (10b) is formed in the lower-stage member (2). A cylindrical spacer (12) provided with a flange (12a) is fitted into the small diameter portion (11b) of the bolt insertion hole, wherein the cylindrical spacer (12) has an inner diameter which is larger than the diameter of the bolt shaft portion (10b), has a lower end which is received by the support member (9), and an upper end which receives the bolt head portion (10a) in the inside of the large diameter portion (11a). Between a lower surface of the flange (12a) of the spacer (12) and the stepped portion (11c), an annular elastic member (21) which biases the lower-stage member (2) downward (toward the support member (9)) is interposed. The lower-stage members (2) each of which is provided with the bolt insertion hole (11) and is arranged between the support member (9) and the upper-stage member (4), (5), (6), (7) are mounted on the support member (9) by the bolts (10). The spacer (12) may be a spacer having no flange (12a). In this case, the elastic member (21) is interposed between a lower surface of the bolt head portion (10a) and the stepped portion (11c).

The fixing device for a lower-stage member according to the present invention is characterized by the shape of the elastic member (21). The elastic member (21) is formed of an annular-shaped body made of rubber or a synthetic resin. With respect to the shape of the elastic member (21) before the upper-stage member (the body of the upper-stage member is indicated by symbol (5a)) shown in FIG. 2 is fixed to the lower-stage member (2), cutouts (21a), (21b) are formed on upper and lower portions of an outer peripheral surface of the elastic member (21) and hence, the elastic member (21) is elastically deformable by bending.

Figure 6:
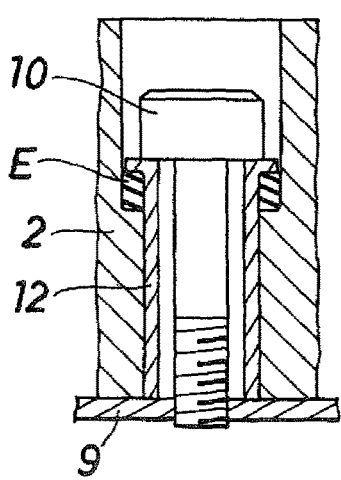
FIG. 6(A) and FIG. 6(B) are views for explaining a leveling function of the fixing device for a lower-stage member.
Figure 6:
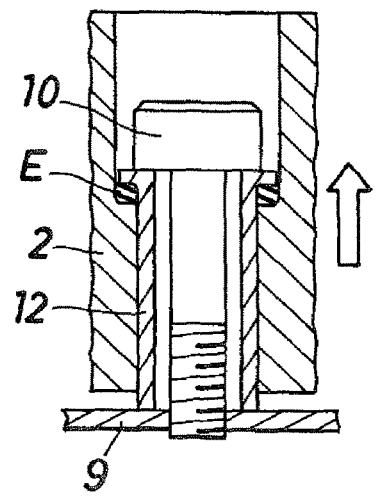

FIG. 6(A), and FIG. 6(B) are views for explaining a leveling function of the fixing device for a lower-stage member, and shows the positional relationship between the fixing device before the upper-stage member is fixed (FIG. 6(A)) and the fixing device after the upper-stage member is fixed (FIG. 6(B)). In FIG. 6(A), and FIG. 6(B), the bolt (10) fixes the spacer (12) to the support member (9) and hence, the bolt (10) and the spacer (12) are not movable relative to the support member (9). As shown in FIG. 6(A), the lower-stage member (2) receives a downward force from the spacer (12) by way of the elastic member (E) and hence, a lower surface of the lower-stage member (2) is brought into contact with the support member (9) whereby the lower-stage member (2) is not movable. An elastic force of the elastic member (E) made of rubber is smaller than a force of a hand and hence, by applying an upward force to the lower-stage member (2) against the elastic force, as shown in FIG. 6(B), a user can lift up the lower-stage member (2) with his hand. Accordingly, when an upper surface of a certain lower-stage member (2) is low, by upwardly moving the lower-stage member (2) against the elastic force of the elastic member (E), an upper surface position of the lower-stage member (2) can be finely adjusted, that is, leveling can be performed.

Figure 7:
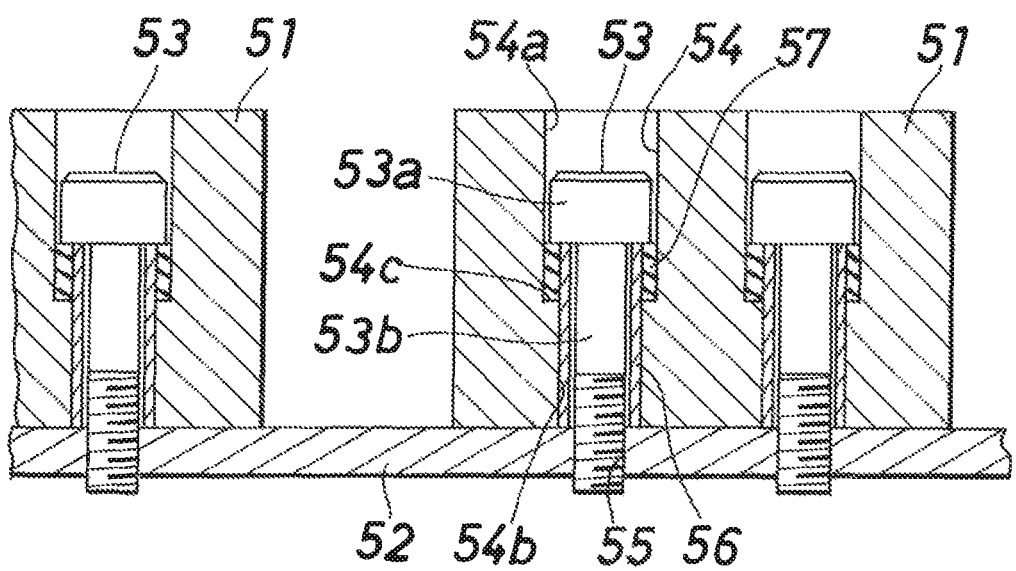
FIG. 7 is a side cross-sectional view showing a conventional fixing device for a lower-stage member.

In a conventional fixing device shown in FIG. 7, a rubber washer (57) is used as the elastic member (E), and the rubber washer (57) has a rectangular shape in cross section and is configured to be filled in a space formed between a head portion (53a) of a joint fixing bolt (53) and a stepped portion (54c) of a bolt insertion hole (54). Accordingly, when the rubber washer (57) is used as the elastic member (E), a movable amount of the lower-stage member (2) at the time of fixing the upper-stage member is limited, and an elastic force (repulsive force) of the elastic member (E) is largely increased by upwardly moving the lower-stage member (2) and hence, there arises a drawback that the leveling operation becomes difficult.

The elastic member (21) of the fixing device for a lower-stage member of the present invention shown in FIG. 2 has an approximately lateral T shape in cross section where the elastic member (21) is formed of a vertical portion and a horizontal portion which extends radially outward from a center portion of the vertical portion in the radial direction, and is formed in a shape where upper and lower corner portions of the vertical portion on an inner peripheral side are cut out. In other words, the elastic member (21) is formed of an annular body having an octagonal shape in cross section formed by cutting out four corners of a vertically-elongated rectangular shape as the reference, and the cutouts (21a), (21b) are formed on the upper portion and the lower portion of the outer peripheral surface of the annular body respectively.

Figure 3:
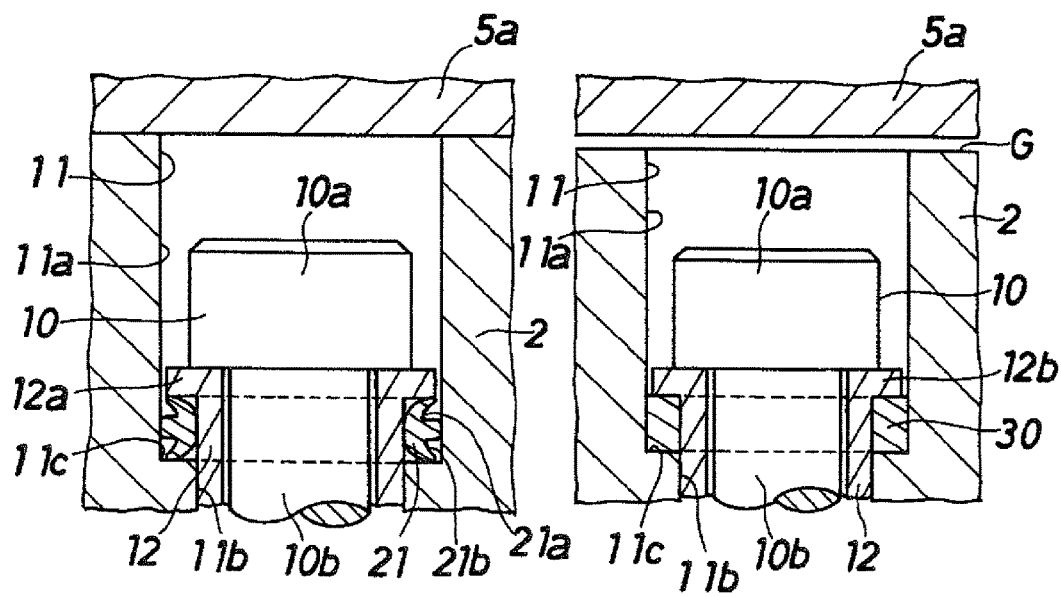
FIG. 3(A) is a view showing a state where the lower-stage member is moved upward from a state shown in FIG. 2.
FIG. 3(B) is a view showing a state of a conventional product corresponding to the state shown in FIG. 3(A).

The elastic member (21) of the fixing device for a lower-stage member according to the present invention includes the cutouts (21a), (21b) and hence, the upper and lower end portions of the vertical portion can be elastically deformed by bending in a state where cross-sectional areas of the cutouts (21a), (21b) are decreased. FIG. 3(A) shows a shape of the elastic member (21) after the elastic member (21) is deformed.

FIG. 3(B) shows a case where an elastic member (30) on which a cutout is not formed is used for comparison. In FIG. 3(B), when the lower-stage member (2) is made to move upward, a space formed between the flange (12a) of the spacer (12) and the stepped portion (11c) is filled with the elastic member (30) at an early stage so that a repulsive force is increased whereby the succeeding movement of the lower-stage member (2) in the upward direction becomes difficult. Accordingly, there exists a possibility that a gap (G) remains between the body (5a) of the upper-stage member and the lower-stage member (2).

To the contrary, in the elastic member (21) shown in FIG. 2, as shown in FIG. 3(A), a gap between the body (5a) of the upper-stage member and the lower-stage member (2) can be eliminated and hence, the elastic member (21) is in a state where the elastic member (21) can be further elastically deformed by bending from such a state whereby a leveling operation can be performed extremely easily. Further, since the elastic member (21) can be elastically deformed by bending, the fixing device of the present invention is advantageous compared to the prior art also with respect to a vibration absorbing effect.

The above-mentioned example is only one example, and the shape of the elastic member can be changed variously. For example, the number of cutouts may be two, the position where the cutout is formed may be changed or the number of cutouts may be one or three or more. The elastic member (21) having two cutouts is shown in FIG. 4(A), FIG. 4(B), FIG. 4(C) and FIG. 4(D), while the elastic member having one or three or more cutouts is shown in FIG. 5(A), FIG. 5(B), and FIG. 5(C).

Figure 4:
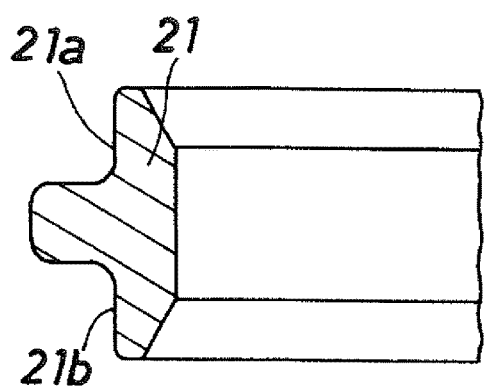
FIG. 4(A), FIG. 4(B), FIG. 4(C), and FIG. 4(D) are cross-sectional views showing examples of elastic members which can be used in the fixing device for a lower-stage member according to the present invention.
Figure 4:
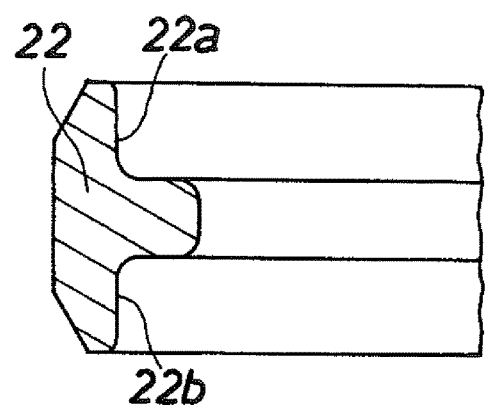
Figure 4:
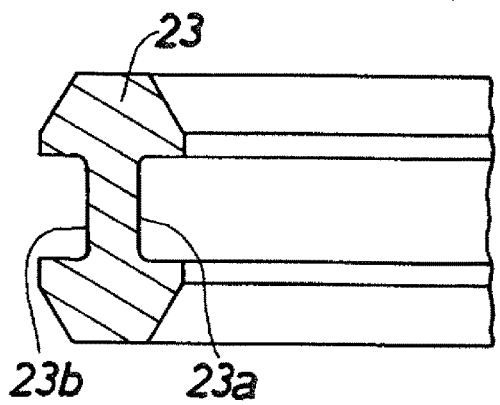
Figure 4:
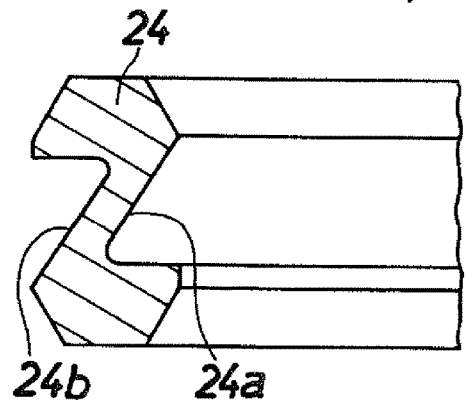

The elastic member (21) shown in FIG. 4(A) is the same elastic member (21) shown in FIG. 2. While the elastic member shown in FIG. 4(A) is provided with the cutouts (21a), (21b) on two portions, that is, an upper portion and a lower portion of an outer peripheral surface of the elastic member (21) respectively, the elastic member (22) shown in FIG. 4(B) is provided with the cutouts (22a), (22b) on two portions, that is, an upper portion and a lower portion of an inner peripheral surface of the elastic member (22) respectively (cross-sectional shape being approximately lateral T shape with inside and outside reversed).

The elastic member (23) shown in FIG. 4(C) is provided with cutouts (23a), (23b) on two portions in total such that the cutout (23a) is formed on one portion of a vertical center portion of an inner peripheral surface of the elastic member (23) and the cutout (23b) is formed on one portion of a vertical center portion of an outer peripheral surface of the elastic member (23). Cross-sectional shapes of the cutouts (23a), (23b) are an approximately rectangular shape in the same manner as the above. Accordingly, the elastic member (23) has an approximately I-shaped cross-sectional shape. The elastic member (24) shown in FIG. 4(D) is, in the same manner as the elastic member (23) shown in FIG. 4(C), provided with cutouts (24a), (24b) on two portions in total such that the cutout (24a) is formed on one portion of a vertical center portion of an inner peripheral surface of the elastic member (24) and the cutout (24b) is formed on one portion of a vertical center portion of an outer peripheral surface of the elastic member (24). By forming cross-sectional shapes of the cutouts (24a), (24b) into an approximately triangular shape, the elastic member (24) has an approximately Z-shaped cross-sectional shape.

Figure 5:
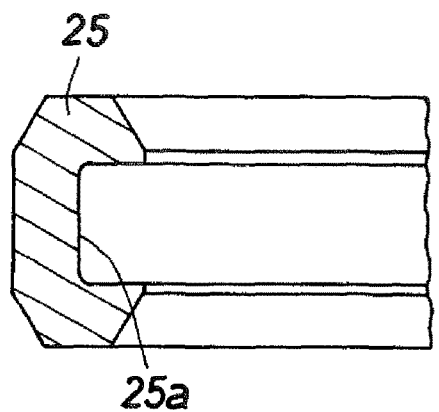
FIG. 5(A), FIG. 5(B) and FIG. 5(C) are cross-sectional views showing other examples of the elastic members which can be used in the fixing device for a lower-stage member of the present invention.
Figure 5:
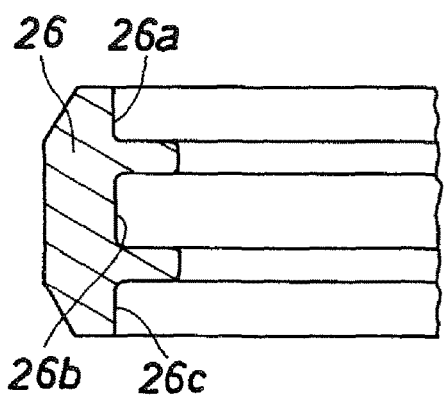
Figure 5:
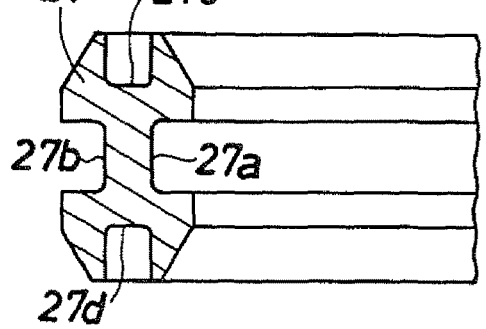

The elastic member (25) shown in FIG. 5(A) is provided with a cutout (25a) only one portion of a vertical center portion of an inner peripheral surface of the elastic member (25), and the elastic member (25) has an approximately C-shaped or approximately U-shaped cross-sectional shape. The cross-sectional shape of the cutout (25a) may be formed into a rectangular shape, a triangular shape, an arcuate shape or the like in cross section. Although not shown in the drawing, the similar cutout (25a) may be formed on an outer peripheral surface of the elastic member (25) instead of the inner peripheral surface of the elastic member (25).

The elastic member (26) shown in FIG. 5(B) is provided with cutouts (26a), (26b), (26c) on three portions in total such that the cutout (26a) is formed on one portion of an upper portion of an inner peripheral surface of the elastic member (26), the cutout (26b) is formed on one portion of a center portion of the inner peripheral surface of the elastic member (26), and the cutout (26c) is formed on one portion of a lower portion of the inner peripheral surface of the elastic member (26). That is, the elastic member (26) has an approximately lateral Π-shaped cross-sectional shape. Although not shown in the drawing, similar cutouts (26a), (26b), (26c) may be formed on an outer peripheral surface of the elastic member (26) instead of the inner peripheral surface of the elastic member (26).

The elastic member (27) shown in FIG. 5(C) is provided with cutouts (27a), (27b), (27c), (27d) on four portions in total such that the cutout (27a) is formed on one portion of a vertical center portion of an inner peripheral surface of the elastic member (27), the cutout (27b) is formed on one portion of a vertical center portion of an outer peripheral surface of the elastic member (27), the cutout (27c) is formed on one portion of a center portion of an upper surface of the elastic member (27), and the cutout (27d) is formed on one portion of a center portion of a lower surface of the elastic member (27).

All of the elastic members (21), (22), (23), (24), (25), (26), (27) shown in FIG. 4(A), FIG. 4(B), FIG. 4(C) and FIG. 4(D) and FIG. 5(A), FIG. 5(B), and FIG. 5(C) are respectively formed of an annular body made of rubber or a synthetic resin, and the cutout (21a), (21b), (22a), (22b), (23a), (23b), (24a), (24b), (25a), (26a), (26b), (26c), (27a), (27b), (27c), (27d) which enable the elastic deformation by bending of the elastic member (21), (22), (23), (24), (25), (26), (27) when a force in the vertical direction is applied is formed on at least one portion of the outer peripheral surface, the inner peripheral surface, the upper surface, and the lower surface of the elastic member. Accordingly, a leveling operation for making upper surfaces of the lower-stage members (2) coplanar can be easily performed, and a vibration absorbing effect of the elastic member (21), (22), (23), (24), (25), (26), (27) can be further enhanced.

INDUSTRIAL APPLICABILITY

The fixing device for a lower-stage member according to the present invention is used in a fluid control device which is assembled such that a fluid control unit is fixed in a straddling manner over a plurality of joints. According to the present invention, it is possible to acquire a fluid control device which can easily perform a leveling operation for making upper surfaces of lower stage members coplanar, and can also further enhance a vibration absorbing effect of the elastic member.

The invention claimed is:

1. A fixing device for fixing a lower-stage member arranged between a support member and an upper-stage member to the support member by a bolt, the fixing device comprising:
    a bolt insertion hole formed in the lower-stage member and provided with a large-diameter portion having a diameter larger than a diameter of a bolt head portion and a small-diameter portion which is contiguously formed with the large-diameter portion below the large-diameter portion by way of a stepped portion and has an intermediate diameter between the diameter of the bolt head portion and a diameter of a bolt shaft portion,
    a cylindrical spacer which has an inner diameter larger than the diameter of the bolt shaft portion, has a lower end thereof received by the support member and has an upper end thereof disposed in the inside of the large-diameter portion, the spacer being fitted into the small-diameter portion of the bolt insertion hole, and
    an elastic member which biases the lower-stage member toward the support member and which is interposed between the bolt head portion and the stepped portion,
    wherein
    the lower-stage member is moved upwardly against an elastic force of the elastic member,
    the elastic member consists of:
        an annular body arranged between a lower surface of a flange mounted on an upper end portion of the spacer and a stepped portion; and
        two cutouts,
    a cross-sectional shape of the elastic member from which the two cutouts are formed is an octagonal shape which is formed by cutting four corners of a rectangular shape elongated in a vertical direction,
    one of the cutouts is formed on a vertical center portion of the inner peripheral surface and the other cutout is formed on a vertical center portion of the outer peripheral surface of the elastic member,
    a gap between the upper-stage member and the lower-stage member can be eliminated, and
    the elastic member is in a state in which the elastic member can be further elastically deformed by bending from the state.

2. A fluid control device comprising:
    a plurality of block joints in each of which a fluid path opening upward is formed;
    a plurality of fluid control units in each of which a fluid path communicated with the fluid path of the block joint and opening downward is formed;
    a plurality of seal portions which are interposed on abutting surfaces between the fluid paths of the block joints and the fluid paths of the fluid control units;
    a support member for supporting the plurality of block joints;
    a plurality of bolts for mounting the respective block joints to the support member; and
    another plurality of bolts for mounting the respective fluid control units to the block joints, wherein the block joint constitutes a lower-stage member, and the block joint is mounted on the support member by the above-mentioned fixing device described in claim 1.

3. A fixing device for fixing a lower-stage member arranged between a support member and an upper-stage member by a bolt, the fixing device comprising:
    a bolt insertion hole formed in the lower-stage member and provided with a large-diameter portion having a diameter larger than a diameter of a bolt head portion and a small-diameter portion which is contiguously formed with the large-diameter portion below the large-diameter portion by way of a stepped portion and has an intermediate diameter between the diameter of the bolt head portion and a diameter of a bolt shaft portion,
    a cylindrical spacer which has an inner diameter larger than the diameter of the bolt shaft portion, has a lower end thereof received by the support member and has an upper end thereof disposed in the inside of the large-diameter portion, the spacer being fitted into the small-diameter portion of the bolt insertion hole, and an elastic member which biases the lower-stage member toward the support member and which is interposed between the bolt head portion and the stepped portion, wherein the lower-stage member is moved upwardly against an elastic force of the elastic member, the elastic member consists of:
  an annular body arranged between a lower surface of a flange mounted on an upper end portion of the spacer and a stepped portion; and
  four cutouts, a cross-sectional shape of the elastic member from which the four cutouts are formed is an octagonal shape which is formed by cutting four corners of a rectangular shape elongated in a vertical direction, each cutout is formed on a vertical center portion of the inner peripheral surface, a vertical center portion of the outer peripheral surface, a center portion of an upper surface, and a center portion of a lower surface of the elastic member respectively, a gap between the upper-stage member and the lower-stage member can be eliminated, and the elastic member is in a state in which the elastic member can be further elastically deformed by bending from the state.

4. A fluid control device comprising:

a plurality of block joints in each of which a fluid path opening upward is formed;

a plurality of fluid control units in each of which a fluid path communicated with the fluid path of the block joint and opening downward is formed;

a plurality of seal portions which are interposed on abutting surfaces between the fluid paths of the block joints and the fluid paths of the fluid control units;

a support member for supporting the plurality of block joints;

a plurality of bolts for mounting the respective block joints to the support member; and another plurality of bolts for mounting the respective fluid control units to the block joints, wherein the block joint constitutes a lower-stage member, and the block joint is mounted on the support member by the above-mentioned fixing device described in claim 3.

* * * * *